United States Patent
Kramer et al.

(10) Patent No.: US 6,934,849 B2
(45) Date of Patent: Aug. 23, 2005

(54) METHOD AND SYSTEM FOR AUTHORIZING A COMMERCIAL TRANSACTION

(75) Inventors: Michaek Kramer, Gauting (DE); Jörg Tacke, Starnberg (DE)

(73) Assignee: Voice, Trust AG, Munich (DE)

( * ) Notice: Subject to any disclaimer, the term of this patent is extended or adjusted under 35 U.S.C. 154(b) by 103 days.

(21) Appl. No.: 10/332,466

(22) PCT Filed: Jul. 13, 2001

(86) PCT No.: PCT/EP01/08164
§ 371 (c)(1),
(2), (4) Date: Mar. 27, 2003

(87) PCT Pub. No.: WO02/07107
PCT Pub. Date: Jan. 24, 2002

(65) Prior Publication Data
US 2003/0161503 A1 Aug. 28, 2003

(30) Foreign Application Priority Data
Jul. 14, 2000 (EP) .......................................... 00115309

(51) Int. Cl.$^7$ ................................................ G06K 9/00
(52) U.S. Cl. ................... 713/186; 713/161; 713/168; 705/18; 705/44; 379/220.01; 379/221.02; 382/115; 382/181
(58) Field of Search ............................... 713/161, 168, 713/186; 705/18, 44, 1, 26, 39, 78, 53, 67, 75, 76; 379/220.01, 221.02; 382/115, 181

(56) References Cited

U.S. PATENT DOCUMENTS

| | | | |
|---|---|---|---|
| 3,792,446 A | | 2/1974 | McFiggins et al. |
| 3,896,266 A | | 7/1975 | Waterbury |
| 5,339,385 A | | 8/1994 | Higgins |
| 5,806,040 A | | 9/1998 | Vensko |
| 5,870,723 A | * | 2/1999 | Pare et al. ..................... 705/39 |
| 6,097,802 A | * | 8/2000 | Fleischer et al. ...... 379/211.02 |
| 6,366,682 B1 | * | 4/2002 | Hoffman et al. ............. 382/115 |
| 6,453,301 B1 | * | 9/2002 | Niwa ........................... 705/26 |
| 6,510,415 B1 | * | 1/2003 | Talmor et al. ............... 704/273 |

FOREIGN PATENT DOCUMENTS

| | | |
|---|---|---|
| EP | 444 351 A2 | 9/1991 |
| EP | 0 454 363 A2 | 10/1991 |
| EP | 0 808 048 A2 | 11/1997 |

* cited by examiner

*Primary Examiner*—Gregory Morse
*Assistant Examiner*—Tongoc Tran
(74) *Attorney, Agent, or Firm*—Nixon Peabody LLP; Donald R. Studebaker

(57) ABSTRACT

The invention relates to a method and system for authorizing a commercial transaction between a customer and a goods or service provider via an authorization service provider with authentication of the customer by comparing a biometric sample of the customer with a biometric model of the customer stored with the authorization service provider. The telephone link between the supplier and the authorization service provider is set up via a router which associates the real telephone number of the authorization service provider and the telephone number of the supplier with a virtual telephone number and transmits a code which is isochronously calculated by the router and the authorization provider with the aid of the same algorithm. The telephone link is accepted by the authorization service provider if the supplier is registered with the authorization service provider if the supplier is registered with authorization service provider under the transmitted number and if the transmitted code corresponds to the calculated code contained by said authorization service provider. An identifier and biometric code of the customer are transmitted to the authorization service provider in addition to the amount which is to be transferred. The transaction is initiated by the authorization provider if the correspondence between the biometric sample and the stored biometric model exceeds a predetermined thresh old value.

7 Claims, 3 Drawing Sheets

METHOD AND SYSTEM FOR AUTHORIZING A COMMERCIAL TRANSACTION

The present invention relates to a method and a system for authorizing a commercial transaction between a customer and a goods or service provider via an authorization service provider, the transaction including authentication of the customer by comparing a biometric sample of the customer with a biometric model of the customer stored with the authorization service provider.

BACKGROUND OF THE INVENTION

Due to the comprehensive use of electronic data processing systems for financial transactions, systems for identifying and/or authenticating persons prior to the implementation of commercial transactions are becoming more and more important. The identification of a person, which is usually necessary at the beginning of the process, serves the purpose of determining the identity of the person in question. Authentication is generally defined as a control process which takes place after identification and with which it can be ascertained whether the information given by the person in the course of identification is correct; it thus serves the purpose of verifying the identity of the person.

At present, two "token"-based methods are customary in financial transactions. In this context, tokens are defined as key objects used in the identification/authentication process, i.e. primarily the conventional magnetic-strip or chip cards. When customers are prepared to pay, they identify themselves with their bank card or credit card on which the customer's signature is shown, and in which a usually four-digit personal identification number (PIN) is stored that is known only to the customer.

With the first customary method, customers must provide a signature with the salesperson in attendance, and authentication is made visually by comparing the customer's signature with the signature shown on the card. This method is often proving to be unsatisfactory due to its imminent flaws caused by the fact that with the variety of writing utensils and on different writing surfaces, signatures can vary and are often quite easy to forge. Furthermore, the sales staff is often negligent in checking the signatures.

In addition, it may happens, for example in restaurants, that fraudulent personnel can, in a short time span and unnoticed, use a customer's credit card to create an illegal copy on which a transaction unauthorized by the customer is later written.

With the second customary method, customers authenticate themselves by inserting their PIN unseen by others in a card reader installed by the goods or service provider, which is connected via a communication network with the financial institution carrying out the desired transaction, and which authorizes this transaction when the PIN entered by the customer is identical to the PIN stored in the card.

However, the principle of personal identification numbers has several disadvantages, some of which will be explained briefly below.

A person's PIN, which is not context-related but chosen purely at random, is usually written down by the customer in a presumably secure place, such as a note pad or an appointment calendar, since otherwise the customer may forget the PIN as time goes on. However, writing down the personal identification number is risky, because there is, of course, always the danger of losing the note pad or appointment calendar. As a result, the personal identification number is irretrievably lost, and the owner must apply for a new bank card or credit card with a new personal identification number, which is usually connected with an inordinate amount of administrative work, is time-consuming and often also expensive.

Furthermore, there is a risk of card abuse when a third party comes into possession of a PIN or password. This can happen when a person is surreptitiously watching the owner as he enters the PIN, or when documents such as notebooks or appointment calendars (in which such personal identification numbers are usually written) are stolen together with the bank card or credit card, or if the unauthorized person loses them, and another person finds them and makes unauthorized use of them.

Unreasonably, consumers often write their PIN directly on the bank card or credit card, so that thieves, when they steal the card, automatically are in possession of the PIN which allows them to make a false authentication. Neither can it be ruled out that a card thief uses electronic means to obtain knowledge of the PIN stored in a card.

In a newer class of authentication methods are so-called biometric methods that utilize electronic evaluation of physiological characteristics such as fingerprints, iris patterns of the eye, or individual voice characteristics (the so-called voice prints). These have the advantage that customers do not have to carry any cards or other tokens of any kind.

WO 98/09227 discloses a method and a system for authorizing commercial transactions between a customer and a vendor without the use of an authentication token, whereby the buyer signals his acceptance of the vendor's offer to implement the transaction by entering his personal authentication information, consisting of a PIN and one or more biometric samples, which are then transmitted to a computer system which compares the received authentication information of the buyer with biometric samples acquired in a registration process. If the computer system successfully identifies the buyer, the buyer's account is debited by an amount that is credited to the vendor's account, and the result of the transaction is transmitted to the vendor as well as to the buyer.

As possible biometric samples to be used, the above patent names a fingerprint of the buyer, an image of the buyer's iris, and the buyer's voice print. As an antidote against theft of the biometric information (in case of a voice print, it might be possible, for example, to secretly record the buyer's voice), WO 98/09227 proposes that the buyer change his PIN that is assigned to the biometric information in the computer's memory. This means that after a theft of the biometric information has occurred, the PIN assumes the task not only of identifying the buyer, but also indirectly of the authentication. With a finite number of digits for the PIN, it would therefore be possible with no more than $10^n$ tries, using the stolen biometric information, to accomplish a wrong authentication and thus a fraudulent transaction.

In general, it should be considered that computer systems communicating via a public communication system are always subject to the risk of manipulation by unauthorized third parties entering the system. If an attempt is made to obtain unauthorized access to a computer system via a publicly accessible network, the manipulator often proceeds by continuously repeated automated dialing (called spamming) of the attacked system. Even if the manipulator were unsuccessful in entering the attacked system, such continuous dialing does interfere with the attacked system's communication and can even lead to the breakdown of its regular communication functions, i.e. the processing of authorized transactions could be interrupted.

To prevent manipulation, it is also desirable that the electronic communication means installed by the vendor is subject to authentication by the computer system undertaking the transaction.

It is an object of the present invention to create a method and a system for authorizing commercial transactions between a buyer and a vendor which provides greater protection against the use by a third party of illegally obtained biometric samples of a person registered as a buyer, as well as against electronic attacks by means of automated continuous dialing (spamming), the method and system furthermore able to ensure the safe identification and authentication of the vendor's connection without the use of a PIN (which has the above described disadvantages), and which can be implemented with a manageable degree of technical complexity.

SUMMARY OF THE INVENTION

This objective is achieved by providing a method and a system for authorizing a commercial transaction between a customer and a goods or service provider via an authorization service provider, the method and system including the authentication of the customer by comparing a biometric sample of the customer with a biometric model of the customer stored with the authorization service provider, wherein a telephone link is established between the goods or service provider and the authorization service provider via a router which assigns the real telephone number of the authorization service provider to a virtual telephone number and transmits the vendor's telephone number and a code which is calculated simultaneously by the router and the authorization service provider by means of the same algorithm, wherein the telephone link is accepted by the authorization service provider when the vendor is registered with the authorization service provider under the transmitted telephone number, and when the transmitted code is identical to the code calculated by the authorization service provider, wherein an identifier to identify the customer and a biometric sample of the customer are transmitted by the customer to the authorization service provider via the established telephone link, wherein further the amount to be transferred and any other data which might be necessary for the transaction are transmitted by the customer to the authorization service provider via the established telephone link, and wherein the transaction is initiated by the authorization service provider when correspondence between the biometric sample and the stored biometric model of the customer is greater than a predetermined threshold value.

In this context, a telephone link is defined as a connection via a network suitable for telephone transmission or via a radio network, and consequently a telephone is defined generally as a device suitable for telephone transmission, and a telephone network is defined as a network suitable for telephone transmission or a radio network, such as an ISDN network or a UMTS network, or the Internet.

An advantage of the invention is that the customer does not have to carry a "token" of any kind, such as a memory card, but that the handling of a payment transaction is just as easy as with a conventional credit card, which means that the invention has the effect of a "virtual credit card" without the risk of losing a real credit card or having it stolen.

In a preferred embodiment of the invention, the biometric sample consists of a sequence of words repeated by the customer, that has previously been conveyed to the customer by the authorization service provider via the established telephone link; the stored biometric model of the customer consists of a voice print of the customer; and verification of whether the repeated sequence of spoken words and the stored voice print correspond is based on individual voice peculiarities which are characteristic for the speaker, and initiation of the transaction by the authorization service provider can proceed only when the repeated sequence of words consists of the same words in the same order as the predetermined sequence (string) of words. The participant does not know the string of spoken words prior to the authentication process, since it changes with each new authentication process, which means that unauthorized voice recordings cannot be used for authentication.

An advantage of this embodiment of the invention is that the unauthorized listening to or recording of an authentication process no longer presents a security risk, since the string of spoken words necessary for authentication changes from one authentication process to another. Another advantage of this embodiment of the invention is that by using the telephone to enter the voice sample required for authentication, no expensive additional installations, such as a fingerprint scanner, are necessary.

In another advantageous embodiment of the invention, the customer transmits the biometric sample via a video telephone installed by the vendor, whereby the biometric sample consists of an electronic image of the customer's face, with which the biometric model, namely a stored electronic image of the customer's face, is compared.

In a preferred embodiment of the invention, the identifier as well as the data required for the transaction are entered by voice. Preferably, the identifier is the customer's name, so that the customer does not have to remember a number or the like.

In another preferred embodiment of the invention, initiation of the transaction is communicated directly to the vendor by the authorization service provider, for example via a fax message, an e-mail message or an SMS (short-message service) message, which means that the vendor can, for example, hand over merchandise to the customer immediately with the assurance that the appropriate payment has already been made. Advantageously, the buyer also receives immediate confirmation that the transaction has been initiated, preferably via the already established telephone link.

To avoid a continuous electronic dialing of the authorization service provider by unauthorized third parties, the link to the authorization service provider for all new authorization processes is effected preferably via an electronic transmitter by means of a virtual switch to real telephone numbers of the authorization service provider that change regularly, for example in 15-minute intervals. The use of such a virtual switch also has the advantage that the security of the link is increased, for example, when sections of the public telephone network fail due to a defect.

The invention has the advantage that the registration process, i.e. the process of initially depositing a voice sample as the reference voice pattern or to create an image of the customer's face, can be very easy and also very safe for the customer. This can be done, for example, by telephone or video telephone from a bank, post office or government office after the customer has identified himself. The institution or agency in question would subsequently confirm the registration process for the authorization service provider. It is also conceivable that customers may register by telephone from their home, with a subsequent written confirmation.

BRIEF DESCRIPTION OF DRAWINGS

Exemplary embodiments of the present invention are described in more detail below, with reference to the drawings, in which.

DETAILED DESCRIPTION OF THE INVENTION

Figure 1:
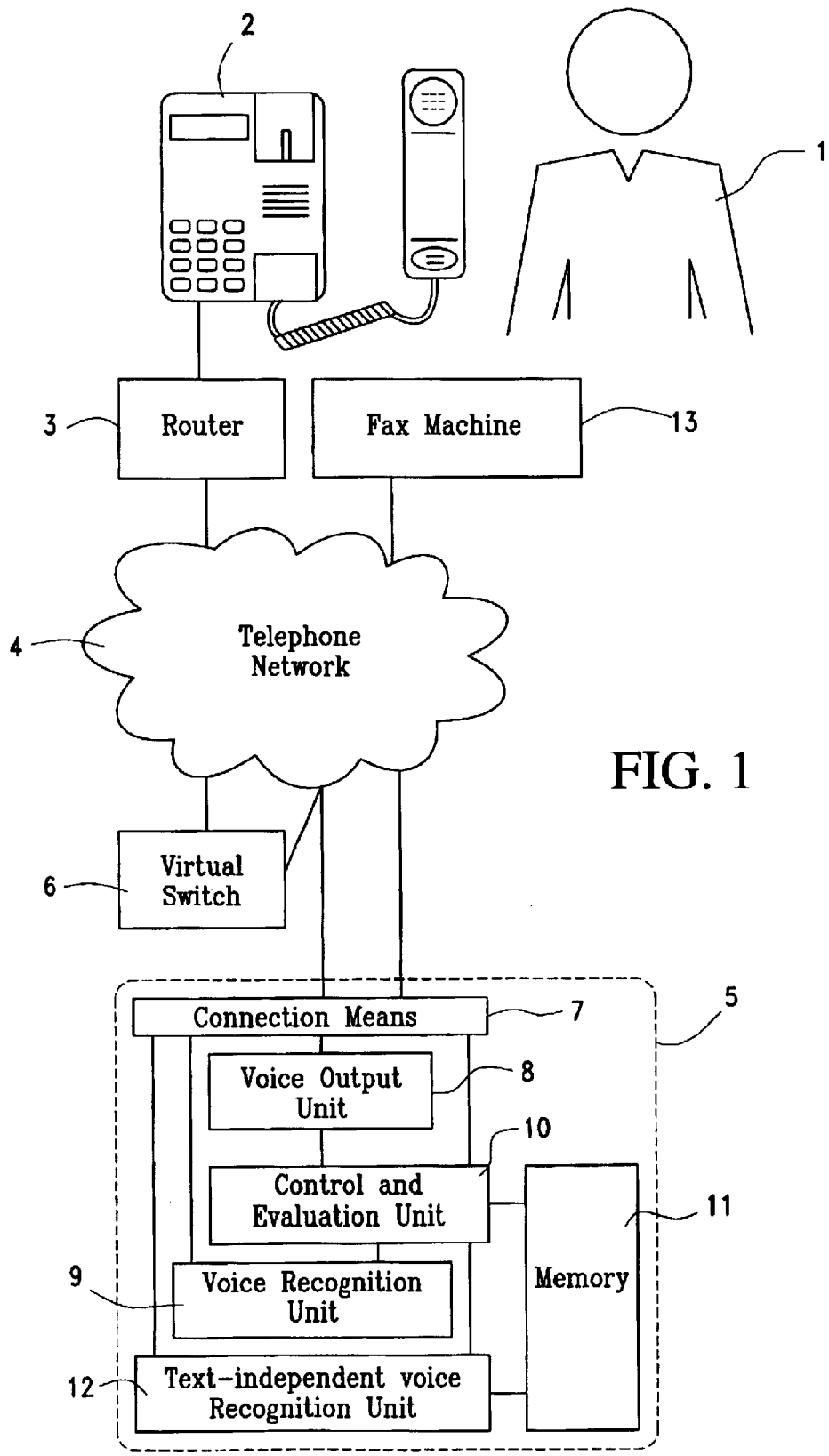
FIG. 1 shows a schematic view of an embodiment of system for authorizing a commercial transaction between a customer and a goods or service provider.

Described below is the authorization of a commercial transaction between a customer and a goods-or-service provider (GSP) by an authorization service provider, the authorization including authentication of the customer by comparing a voice sample with a voice pattern stored with the authorization service provider, according to an embodiment of the inventive system shown schematically in FIG. 1 and in accordance with an embodiment of the method, as shown schematically in FIGS. 2a and 2b.

The customer 1 who is ready to pay at the goods or service provider's telephone set 2, is connected via the telephone network 4 with the authorization service provider 5 by a router 3 installed on the vendor's side. To dial the authorization service provider 5, the router 3 assigns the real telephone number of authorization service provider 5 to a virtual telephone number (step 102 in FIG. 2a). The connection (link) with the authorization service provider 5 is transmitted by a virtual switch 6 to the real telephone number of the authorization service provider 5 via an electronic transmitter (step 103 in FIG. 2a). The real telephone number changes regularly, for example at 15-minute intervals, to prevent the continuous electronic dialing of the authorization service provider 5 by unauthorized third parties ("spamming"). The number of the vendor's telephone set 2 is transmitted to the authorization service provider 5 as a so-called CLIP (calling line identification presentation) and a code calculated by the router 3 installed on the vendor's side (step 105 in FIG. 2a). The code is produced simultaneously with the same algorithm by a connection means 7 of the authorization service provider 5 (step 104 in FIG. 2a). The connection means 7 of the authorization service provider 5 checks the code and the CLIP (step 106 in FIG. 2a) and accepts the connection only if the CLIP can be assigned to a data set stored in a memory 11 registered with the authorization service provider 5, and if the transmitted code coincides with the code calculated by the authorization service provider 5. If this is not the case, the connection is not accepted (step 107 in FIG. 2a). Otherwise, the customer 1 is requested via a voice output unit 8 to speak his full name (first and last name)—step 108 in FIG. 2a.

The customer 1 speaks his full name into telephone 2 (step 109 in FIG. 2a), and the name is transmitted via the telephone network 4 and received by connection means 7. Voice recognition unit 9 implemented by the authorization service provider 5 converts the digitized sound print of the name of the customer 1 into the customer's name. A control and evaluation unit 10 checks whether a reference voice pattern has been stored in memory 11, which pattern can be assigned to the name provided (step 110 in FIG. 2a). If this is not the case, the authentication process is aborted (step 107 in FIG. 2a) and the customer 1 is connected with an operator who may initiate further steps, for example elimination of any technical problems. If a reference voice pattern exists in memory 11, that can be assigned to the name that has been provided, this reference model is downloaded from the memory (step 111 in FIG. 2a). If, in the case of several identical names, several voice patterns exist which could be assigned to the name, all of them are downloaded. Since the customer 1 has stated his/her full name, it is unlikely that a large number of different voice patterns exists that could be potentially assigned.

Figure 2A:
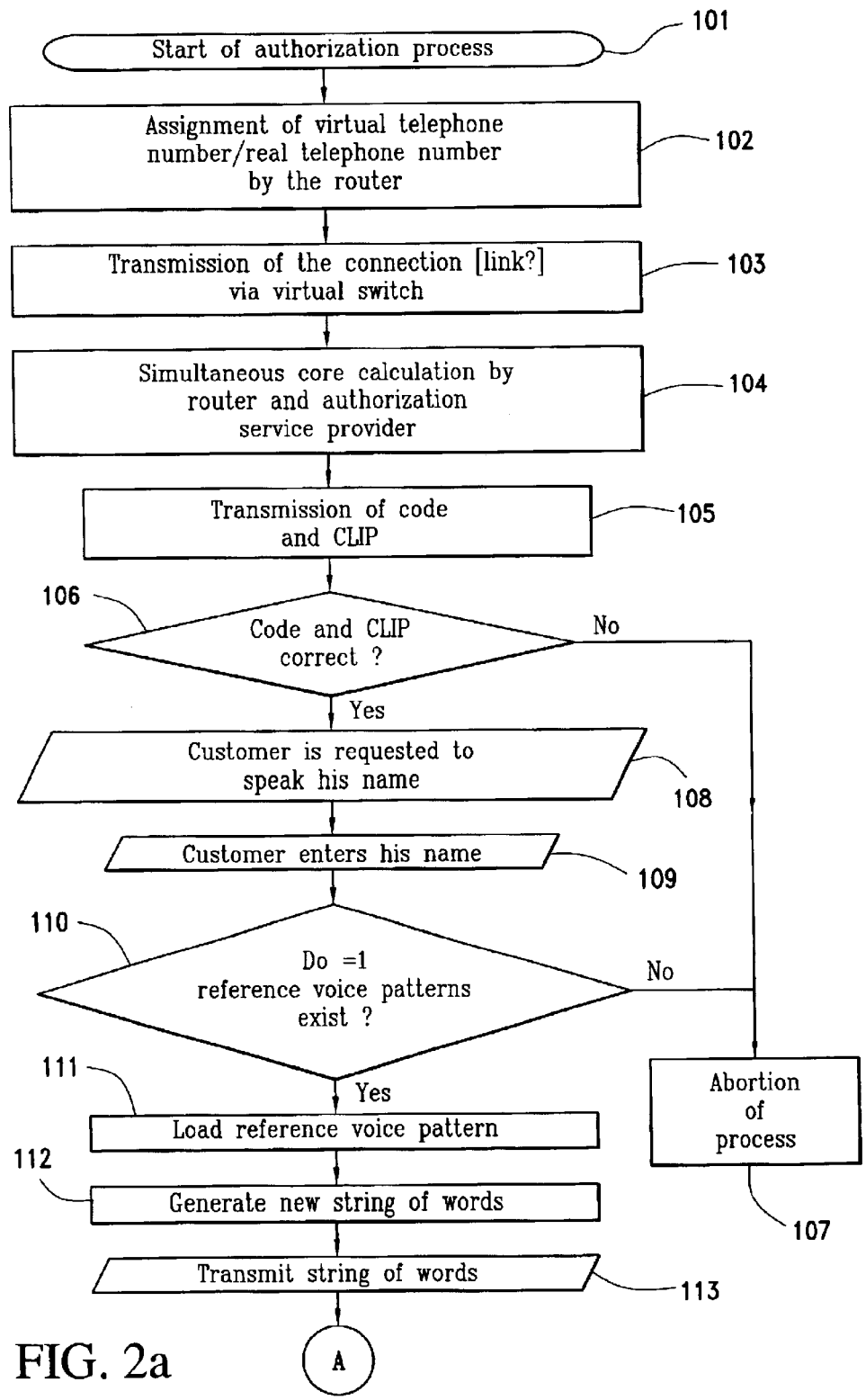
FIGS. 2a, 2b are schematic representations, in the form of flow charts, of exemplary authentication steps of the method according to the invention.

The control and evaluation unit 10, via voice output unit 8, generates a previously unknown string (sequence) of words (step 112 in FIG. 2a) that is transmitted to the customer 1 via telephone network 4 (step 113 in FIG. 2a). The customer 1 repeats the string of words into telephone 2 as a voice sample (step 114 in FIG. 2b) which is then transmitted via telephone network 4 and received by the connection means 7 of the authorization service provider 5. The voice recognition unit 9 of the authorization service provider 5 analyzes whether the digitized string of words consists of the same words in the same order as the string of words generated by the control and evaluation unit 10 via the voice output unit 8 (step 115 in FIG. 2b). If this is not the case, the authorization process is aborted (step 117 in FIG. 2b) and the customer 1 is connected with an operator who may initiate further steps, such as the elimination of technical problems. Otherwise, the process is continued.

Figure 2B:
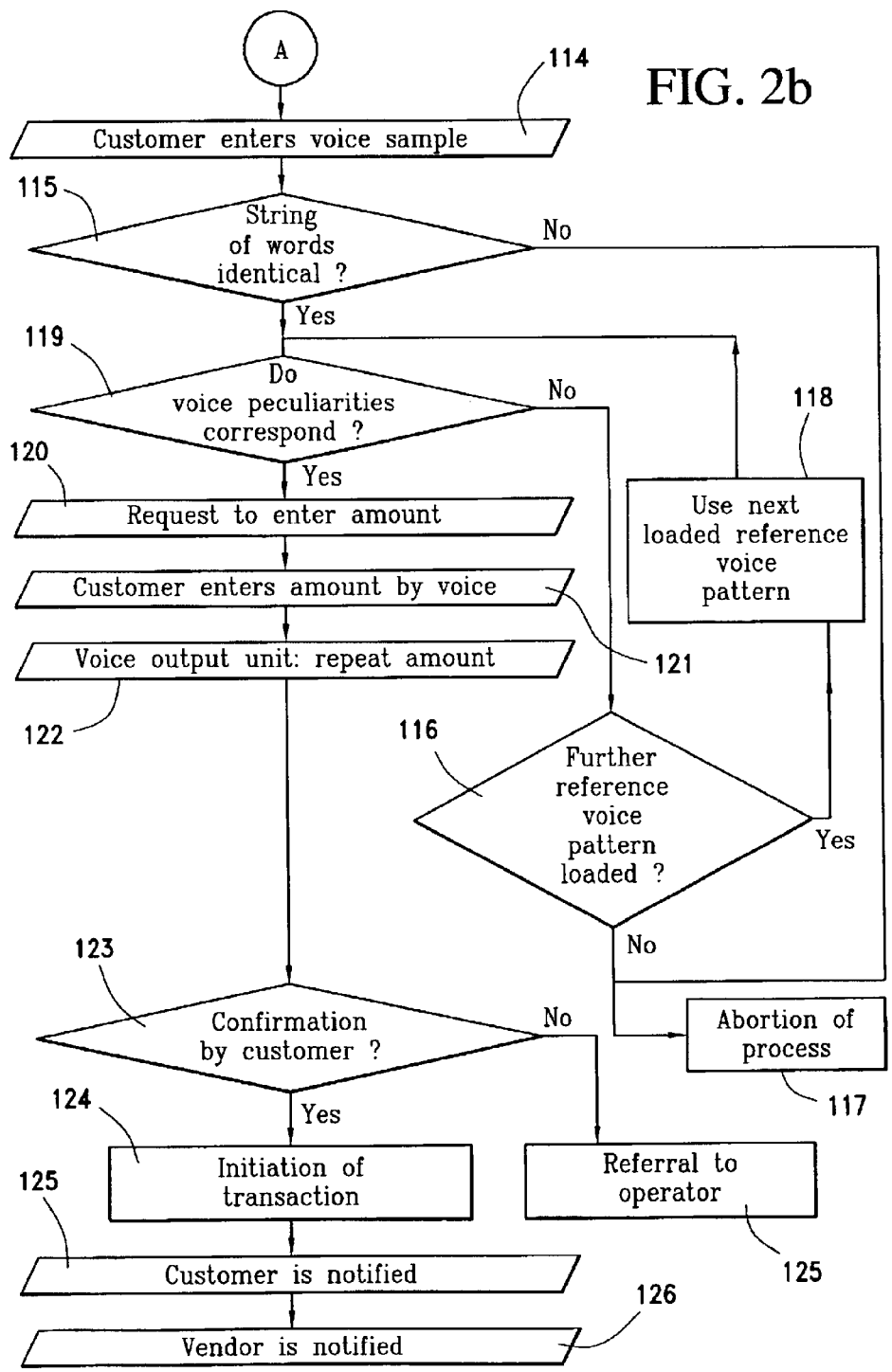

A text-independent voice recognition unit 12 of the authorization service provider 5 compares the digitized string of words with the loaded reference voice pattern or where several voice patterns have been loaded because of several identical names, with the voice pattern loaded first—for individual voice peculiarities which are characteristic for a speaker (step 119 in FIG. 2b). If correspondence between the digitized string of words and the reference voice pattern of the customer 1 with regard to individual voice peculiarities characteristic for a speaker is less than a predetermined threshold value, the control and evaluation unit checks whether another downloaded reference model exists (step 116 in FIG. 2b). If no other loaded reference voice pattern exists, the authorization process is aborted (step 117 in FIG. 2b) and the customer 1 is connected with an operator who may initiate further steps such as the elimination of technical problems.

If correspondence between the digitized string of words and the customer's reference voice pattern with regard to the speaker's characteristic individual voice peculiarities is less than a predetermined threshold value, but other loaded reference voice patterns exist, the next loaded reference voice pattern is used (step 118 in FIG. 2b) and examined for individual voice peculiarities characteristic for a speaker (step 119 in FIG. 2b). If need be, this loop is followed several times until either no further loaded voice pattern exists or correspondence between the digitized string of spoken words and the customer's reference voice pattern in terms of individual voice peculiarities characteristic for the speaker is greater than a predetermined threshold value.

If correspondence between the digitized string of words and the reference voice pattern of the customer 1 in terms of speaker's individual voice peculiarities is greater than a predetermined threshold value, a request to name the amount to be transferred and, if necessary, any further data required for the transaction to be authorized is generated via the voice output unit 8 (step 120 in FIG. 2b) and transmitted to the customer 1 via the telephone network 4. The customer 1 at telephone 2 states the amount to be transferred and, if necessary, any further information required for the transaction to be authorized (step 121 in FIG. 2b). This information is transmitted via the telephone network 4, received by the connection means 7 and translated by the voice recognition unit 9 into a form that can be processed by the control and evaluation unit 10.

The control and evaluation unit 10 causes the voice output unit 8 to repeat the amount (step 122 in FIG. 2b) and to check back with the customer whether the amount to be transferred and any further information required for the transaction to be authorized were understood correctly. This check-back question is transmitted to the customer 1 via the telephone network 4. If the customer 1 confirms that the information is correct (step 123 in FIG. 2b), the transaction is initiated by the control and evaluation unit 10 (step 124 in FIG. 2b), the customer 1 is notified of this via the telephone network 4 in the form of a message generated by the voice output unit 8 (step 125 in FIG. 2b), and the vendor immediately receives a message about the initiation of the transaction on his fax machine 13 (step 126 in FIG. 2b). Otherwise, the customer 1 is connected with an operator who will then be able to initiate the proper steps for authorizing the transaction.

Drawing Legends:

FIG. 1

3 = router
4 = telephone network
6 = virtual switch
7 = connection means
8 = voice output unit
9 = voice recognition unit
10 = control and evaluation unit
11 = memory
12 = text-independent voice recognition unit
13 = fax machine

FIG. 2a 101 start of authorization process
102 assignment of virtual telephone number/real telephone number by the router
103 transmission of the connection [link?] via virtual switch
104 simultaneous core calculation by router and authorization service provider
105 transmission of code and CLIP
106 code and CLIP correct?  Nein = no/ja = yes
107 abortion of process
108 customer is requested to speak his name
109 customer enters his name
110 do = 1 reference voice patterns exist? Nein = no/ja = yes
111 load reference voice pattern
112 generate new string of words
113 transmit string of words

FIG. 2b 114 customer enters voice sample
115 string of words identical?  Nein = no/ja = yes
116 further reference voice pattern loaded?  Ja = yes/nein = no
117 abortion of process
118 use next loaded reference voice pattern
119 do voice peculiarities correspond?  no/yes
120 request to enter amount
121 customer enters amount by voice
122 voice output unit: repeat amount
123 confirmation by customer? Nein = no/ja = yes - - - 125 referral to an operator*
124 initiation of transaction
125 customer is notified
126 vendor is notified

*(note: duplication of reference number 125, the "referral to an operator" is not numbered in the disclosure)

What is claimed is:

1. A method for authorizing a commercial transaction between a customer and a goods-and-service provider (GSP) via an authorization service provider, the method including authentication of the customer by comparing a string of words transmitted from the customer with a voice print of the customer stored with the authorization service provider, the method comprising the following steps:

a) establishing a telephone link via a communication network between the GSP and the authorization service provider via a router,
   wherein the router
   assigns a real telephone number of the authorization service provider to a virtual telephone number, and
   transmits the GSP's telephone number and a code that is calculated simultaneously by the router and the authorization service provider by means of the same algorithm, b) acceptance of the telephone link by the authorization service provider if the GSP is registered with the authorization service provider under the transmitted telephone number and if the transmitted code is identical to the code calculated by the authorization service provider, c) transmission of a customers identifier from the customer to the authorization service provider via the established telephone link, d) transmission of a string of words to the customer by the authorization service provider e) transmission of the string of words repeated by the customer via the established telephone link, f) conveyance of the amount to be transferred and of any other data that may be necessary for the transaction from the customer to the authorization service provider via the established telephone link, and g) initiating the transaction by the authorization service provider if correspondence between the string of words transmitted from the customer and the stored voice print of the customer is greater than a predetermined threshold value, wherein the verification of correspondence between the repeated string of spoken words and the stored voice print is based on the customers individual voice peculiarities, the initiation of the transaction by the authorization service provider proceeds only if the repeated string of words consists of the same words in the same order as the previously transmitted string of words, and the string of words is unknown to the customer prior to a respective authorization process.

2. The method according to claim 1, wherein the identifier as well as the data necessary for the transaction are input by voice.

3. The method according to claim 1, wherein the identifier is the customer's name.

4. The method according to claim 1, wherein the initiation of the transaction is communicated directly to the GSP by the authorization service provider.

5. The method according to claim 1, wherein the initiation of the transaction is confirmed by the authorization service provider directly to the customer via the established telephone link.

6. The method according to claim 1, wherein for each new authorization process, a link to the authorization service provider (ASP) via an electronic transmitter is established to ASP's real telephone numbers that change regularly, to avoid continuous electronic dialing of the ASP by unauthorized third parties and to enhance link security.

7. A system for authorizing a commercial transaction between a customer and a goods-or-service provider (GSP) via an authorization service provider, the transaction including authentication of the customer by comparing a string of words transmitted from the customer with a voice print of the customer stored with the authorization service provider, the system comprising:

- a router, installed on the GSP's side, for assigning a real telephone number of the authorization service provider to a virtual telephone number, for calculating a code and for transmitting the telephone number and the code,
- a connection means for calculating a code simultaneously with the router and using same algorithm, and for verifying, in the course of establishing a link between the GSP and the authorization service provider, whether the GSP is registered with the authorization service provider at the telephone number transmitted by the router, and whether the code transmitted by the router coincides with the code calculated by the connection means, the connection means also for conveying to the customer a generated string of words not known to the customer prior to each respective authorization process, for receiving, via the established telephone link, a customer's identifier, a string of words repeated by the customer after the generated string of words, and the amount to be transferred,
- a memory, disposed within the authorization service providers area, for storing a voice print of the customer,
- a comparator means, disposed within the authorization service provider's area and comprising a voice recognition means for verifying a correspondence of the transmitted string of words with the stored voice print of the customer with regard to a speakers characteristic individual voice peculiarities, and
- a control-and-evaluation unit disposed within the authorization service provider's area for generating the string of words to be conveyed to and to be repeated by the customer and for initiating the transaction if the correspondence between the transmitted string of words and the stored voice print is greater than a predetermined threshold value and if the repeated string of words consists of the same words in the same order as the previously generated word string.

* * * * *